United States Patent
Yoshimura et al.

[11] Patent Number: 5,115,897
[45] Date of Patent: May 26, 1992

[54] CONTROL SYSTEM FOR FLUID COUPLING

[75] Inventors: Hiroshi Yoshimura; Takuji Fujiwara; Kozo Ishii, all of Hiroshima, Japan

[73] Assignee: Mazda Motor Corporation, Hiroshima, Japan

[21] Appl. No.: 517,848

[22] Filed: May 2, 1990

[30] Foreign Application Priority Data

May 10, 1989 [JP] Japan .................. 1-116793

[51] Int. Cl.⁵ .............. F16H 61/14; F16H 45/02; B60K 41/28
[52] U.S. Cl. .................. 192/0.052; 192/0.092; 192/3.3; 192/3.58; 74/890
[58] Field of Search ............ 192/0.052, 0.092, 3.29, 192/3.3, 3.31, 3.58; 74/890; 475/65

[56] References Cited

U.S. PATENT DOCUMENTS

| | | | |
|---|---|---|---|
| 4,448,293 | 5/1984 | Maeda | 192/3.3 |
| 4,457,411 | 7/1984 | Hiramatsu | 192/3.31 X |
| 4,468,988 | 9/1984 | Hiramatsu | 74/868 |
| 4,495,576 | 1/1985 | Ito | 74/890 X |
| 4,535,652 | 8/1985 | Nishikawa et al. | 192/3.58 X |
| 4,582,185 | 4/1986 | Grimes et al. | 192/3.31 X |
| 4,640,394 | 2/1987 | Higashi et al. | 192/3.29 |
| 4,662,488 | 5/1987 | Hiramatsu et al. | 192/3.58 |
| 4,940,122 | 7/1990 | Fujieda | 192/3.31 |
| 5,010,990 | 4/1991 | Yoshimura et al. | 192/3.3 |
| 5,035,308 | 7/1991 | Baba et al. | 192/0.052 |

FOREIGN PATENT DOCUMENTS 60-14653 1/1985 Japan .

Primary Examiner—Richard Lorence
Attorney, Agent, or Firm—Sixbey, Friedman, Leedom & Ferguson

[57] ABSTRACT

A fluid coupling for an automatic transmission includes an input element, an output element and a lockup clutch and is connected to a transmission mechanism. The lockup clutch can engage and disengage to operatively connect and disconnect the input element and the output element with and from each other. Further the lockup clutch can engage in slipping engagement to connect the input element and the output element in such a way as to allow the input element and the output element to rotate relative to each other to some extent. A control system causes the lockup clutch to engage in slipping engagement with a substantially fixed engaging force when the transmission mechanism upshifts while the lockup clutch is in slipping engagement, and to disengage when the transmission mechanism downshifts while the lockup clutch is in slipping engagement.

7 Claims, 10 Drawing Sheets

CONTROL SYSTEM FOR FLUID COUPLING

BACKGROUND OF THE INVENTION

1. Field of the Invention

This invention relates to a control system for a fluid coupling which comprises an input element, an output element and a lockup clutch and is connected to a transmission mechanism mounted on a vehicle, and more particularly to a control system which controls the slippage of the lockup clutch relative to the input element or the output element.

2. Description of the Prior Art

As a torque converter, a fluid coupling which associates with a transmission mechanism to form an automatic transmission for a vehicle, one having a lockup clutch in addition to a pump impeller as the input element and a turbine runner as the output element has been known. In the vehicle provided with an automatic transmission comprising a torque converter with a lockup clutch, there has been proposed to cause the lockup clutch to engage in such a way as to allow some slippage therein thereby producing a speed difference between the pump impeller and the turbine runner when the vehicle is running under a predetermined condition in order to minimize energy loss in the torque converter which occurs when the automatic transmission transmits torque to the wheel driving system from the engine and to suppress vibration of the vehicle body which is generated when fluctuation in torque is transmitted to the wheel driving system from the engine. The engagement of the lockup clutch which produces a speed difference between the pump impeller and the turbine runner will be referred to as "slipping engagement", hereinbelow, and the control which causes the lockup clutch to engage in slipping engagement will be referred to as "slip control" in this specification.

Usually such a slip control of the lockup clutch in the torque converter is effected under a predetermined running condition of the vehicle defined by the engine load and the vehicle speed. For example, as disclosed in Japanese Unexamined Patent Publication No. 57(1982)-33253, the slippage in the lockup clutch is controlled in a feedback control by the use of a controlled variable which is determined on the basis of the difference between a target speed difference between the pump impeller and the turbine runner of the torque converter and the actual speed difference between the pump impeller and the turbine runner. Further as disclosed, for instance, in Japanese Unexamined Patent Publication No. 60(1985)-14653, it has also been proposed to bring the lockup clutch into a particular state of operation free from the controlled variable for a predetermined time interval when the transmission mechanism shifts while the lockup clutch is in the slipping engagement, thereby suppressing shock accompanying the gear shifting.

In accordance with the proposal disclosed in Japanese Unexamined Patent Publication No. 60(1985)-14653, the shock accompanying the gear-shifting can be suppressed to some extent, but since the operation of the automatic transmission differs according to whether the gear-shifting is upshift or downshift, the shock will be better suppressed if the torque converter, more particularly the lockup clutch, is controlled in different ways according to whether the gear-shifting is upshift or downshift.

SUMMARY OF THE INVENTION

In view of the foregoing observations and description, the primary object of the present invention is to provide a control system for a fluid coupling in which the fluid coupling is brought into a particular state of operation, which is free from the controlled variable and is differently set according to the kind of gear-shifting, i.e., whether the gear-shifting is upshift or downshift, for a predetermined time interval when the transmission mechanism shifts while the fluid coupling is in the slipping engagement, so that the shock which is generated in response to the gear-shifting can be better suppressed.

In accordance with the present invention, there is provided a control system for a fluid coupling which includes an input element, an output element and a lockup clutch and is connected to a transmission mechanism, the lockup clutch being able to engage and disengage to operatively connect and disconnect the input element and the output element with and from each other and further being able to engage in slipping engagement to connect the input element and the output element in such a way as to allow the input element and the output element to rotate relative to each other to some extent, said control system comprising a shift detecting means which detects the gear-shifting operation of the transmission mechanism, a hydraulic pressure supply means which supplies hydraulic pressure to the lockup clutch and selectively causes the lockup clutch to engage, engage in slipping engagement and disengage, and a hydraulic control means which controls the hydraulic pressure supply means, characterized in that said hydraulic control means causes the hydraulic pressure supply means to supply hydraulic pressure which causes the lockup clutch to engage in slipping engagement with a substantially fixed engaging force when the shift detecting means detects an upshift operation of the transmission mechanism while the lockup clutch is in slipping engagement, and the hydraulic control means causes the hydraulic pressure supply means to supply hydraulic pressure which causes the lockup clutch to disengage when the shift detecting means detects a downshift operation of the transmission mechanism while the lockup clutch is in slipping engagement.

DESCRIPTION OF THE PREFERRED EMBODIMENT

Figure 1:
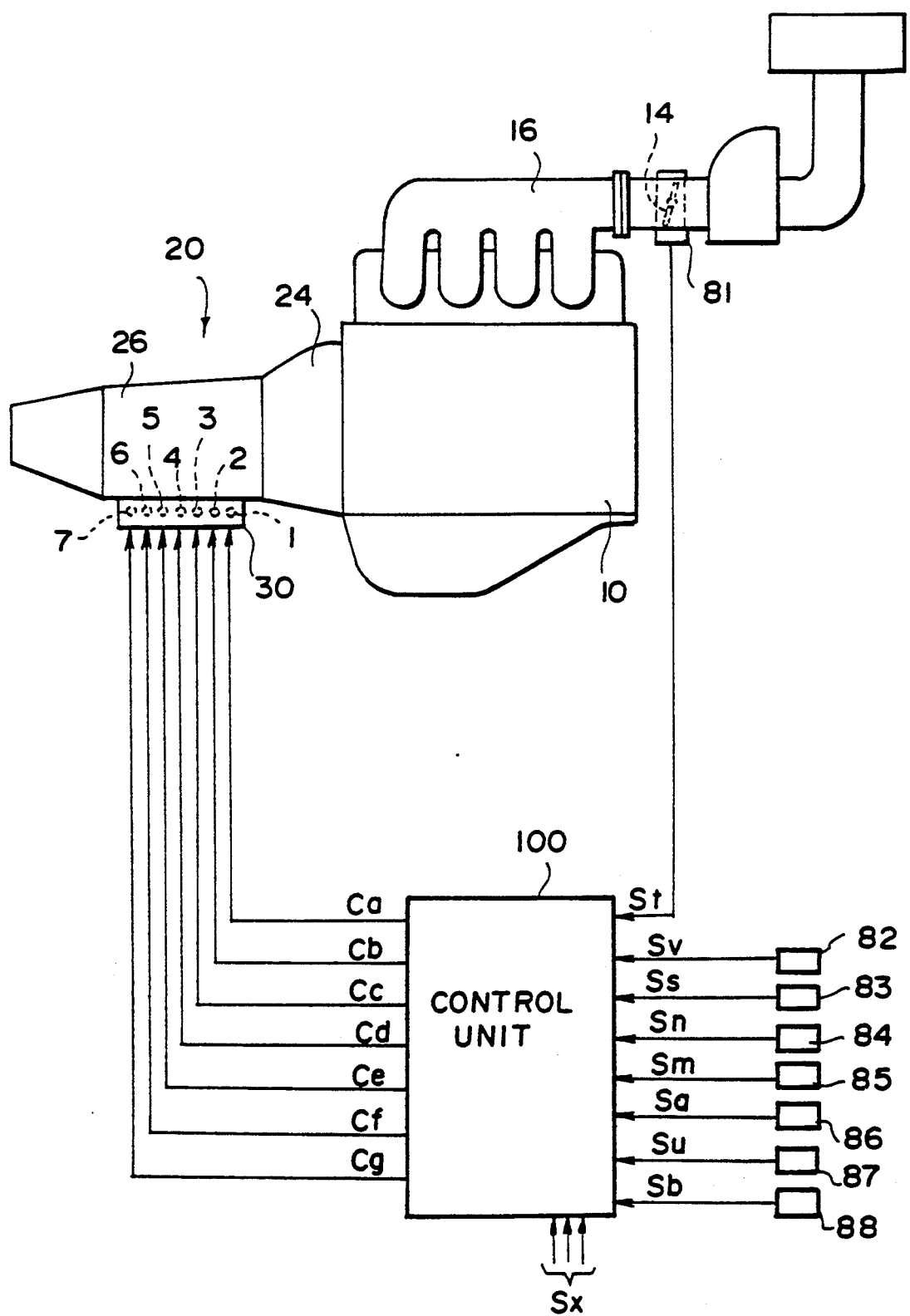
FIG. 1 is a schematic view showing a power plant of a vehicle provided with a control system for a fluid coupling in accordance with an embodiment of the present invention.

In FIG. 1, a power plant comprises an engine 10 and an automatic transmission 20. The engine 10 has four cylinders, for instance, and intake air pours into each cylinder through an intake passage 16 after mixed with fuel which is injected from a fuel injection valve (not shown) disposed in the intake passage 16. The intake passage 16 is provided with a throttle valve 14. The air-fuel mixture thus introduced into each cylinder is burned by a spark made by an ignition system and then burned gas is pushed out of the cylinder into an exhaust passage (not shown). The engine 10 thus produces torque, and the torque is transmitted to the driving wheels (not shown) through a power train which includes the automatic transmission 20.

When the throttle valve 14 is fully closed and the engine speed is not lower than a predetermined value, e.g., 1000 rpm, that is, when the vehicle is regarded as being decelerated, fuel to the engine is cut, and when the engine speed falls below the predetermined value, fuel supply to the engine is restarted.

The automatic transmission 20 comprises a torque converter 24, a multispeed transmission gear mechanism 26, and a hydraulic control circuit 30 which controls the torque converter 24 and the transmission gear mechanism 26. The hydraulic control circuit 30 includes shift control solenoid valves 1 to 5, a lockup control solenoid valve 6 and a pressure regulating solenoid valve 7.

Figure 2:
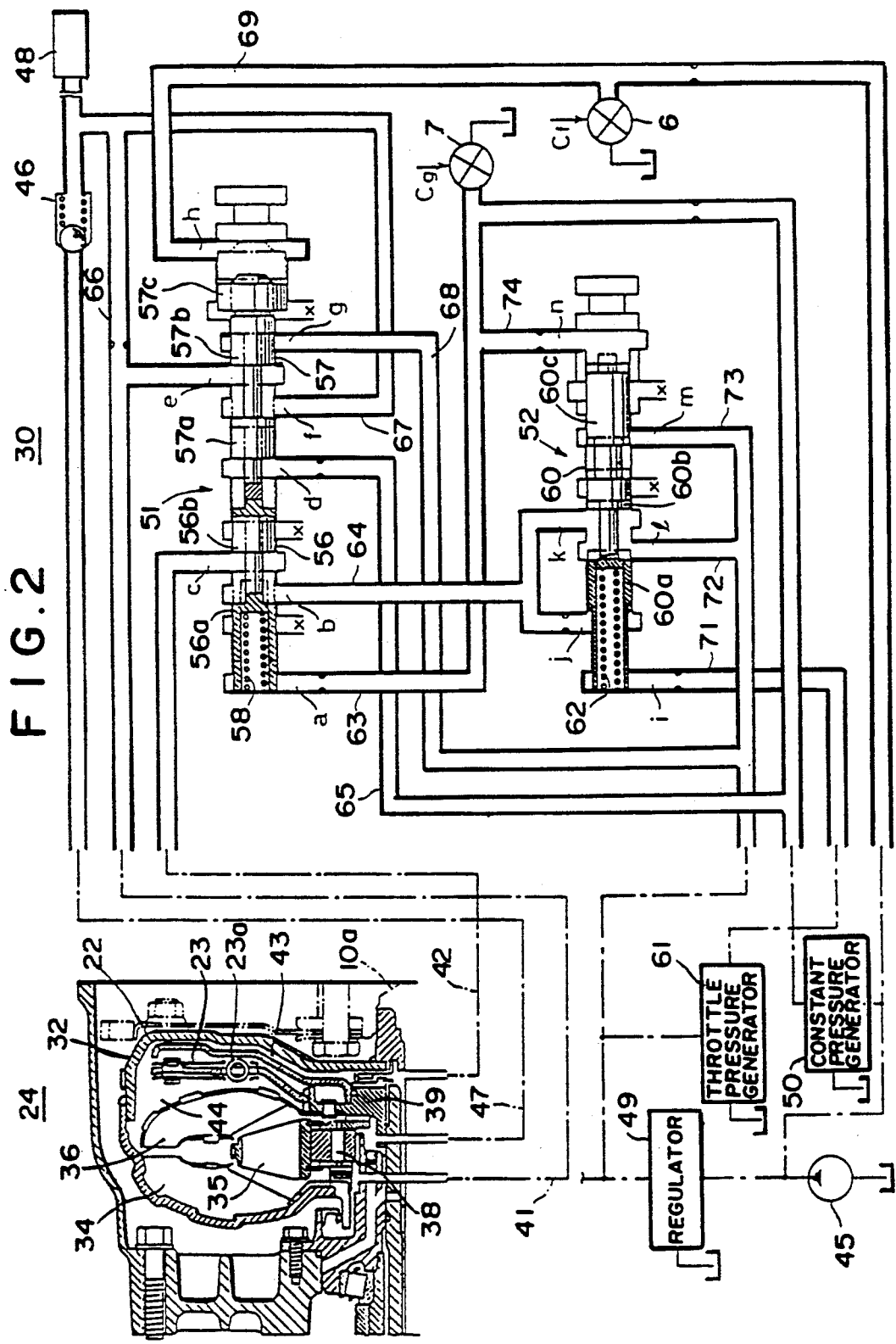
FIG. 2 is a schematic view showing the major part of the control system shown in FIG. 1, FIGS. 3 to 8 are views for illustrating the operation of the control system.

As shown in detail in FIG. 2, the torque converter 24 comprises a driving plate 32 which is driven by an engine output shaft 10a, a pump impeller 34 integrally connected to the driving plate 32, a turbine runner 36 to which the engine output is transmitted from the pump impeller 34, a stator 35 disposed between the pump impeller 34 and the turbine runner 36, and a one-way clutch 38 disposed between the stator 35 and a stationary part of the torque converter 24. The torque converter 24 is further provided with a torsion damper 23 which is disposed between the driving plate 32 and the turbine runner 36 and is spline-coupled to a hub 39 of the turbine runner 36. The torsion damper 23 is connected to a lockup clutch 22 by way of a coil spring 23a. The lockup clutch 22 moves toward and away from the driving plate 32 and rotates together with the turbine runner 36.

The lockup clutch 22 defines a back pressure chamber 43 and an inner pressure chamber 44 between the driving plate 32 and the turbine runner 36. Hydraulic pressure which forces the lockup clutch 22 away from the driving plate 32 is applied to the back pressure chamber 43 from the hydraulic control circuit 30 through an oil passage 42. Hydraulic pressure which forces the lockup clutch 22 toward the driving plate 32 is applied to the inner pressure chamber 44 from the hydraulic control circuit 30 through an oil passage 41.

When the hydraulic pressure in the inner pressure chamber 44 is higher than the hydraulic pressure in the back pressure chamber 43 by not less than a predetermined value, the lockup clutch 22 is moved rightward as seen in FIG. 2 and is brought into friction engagement with the driving plate 32, thereby operatively connecting the pump impeller 34 and the turbine runner 36, that is, the lockup clutch 22 engages. On the other hand, when the hydraulic pressure in the inner pressure chamber 44 is lower than the hydraulic pressure in the back pressure chamber 43 by not less than a predetermined value, the lockup clutch 22 is moved leftward as seen in FIG. 2 away from the driving plate 32, thereby disconnecting the pump impeller 34 from the turbine runner 36, that is, the lockup clutch 22 disengages. Further, when the pressure difference between the inner pressure chamber 44 and the back pressure chamber 43 is within a predetermined range, the lockup clutch 22 engages in the slipping engagement, that is, the lockup clutch 22 engages in such a way as to allow the driving plate 32 and the pump impeller 34 to rotate relative to each other to some extent. As the pressure difference between the inner pressure chamber 44 and the back pressure chamber 43 increases, the friction engaging force between the lockup clutch 22 and the driving plate 32 is increased. The inner pressure chamber 44 communicates with an oil cooler 48 by way of an oil passage 47 provided with a check valve 46.

The hydraulic control circuit 30 is further provided with a lockup shift valve 51 and a lockup pressure regulating valve 52 in addition to the lockup control solenoid valve 6 and the regulating solenoid valve 7. The lockup shift valve 51 has a first spool 56 which is formed with lands 56a and 56b, and a second spool 57 which is formed with lands 57a, 57b and 57c, the lands 57a and 57b having pressure receiving areas equal to those of the lands 56a and 56b and the land 57c having a pressure receiving area which is larger than that of any one of the other lands 56a, 56b, 57a and 57b. The first and second spools 56 and 57 shifts in the axial direction so as to open and close ports a to h and three drain ports x. The first spool 56 is urged rightward as seen in FIG. 2 by a coil spring 58. The lockup pressure regulating valve 52 has a spool 60 which is formed with lands 60a, 60b and 60c and is urged rightward by a coil spring 62. The spool 60 shifts in the axial direction so as to open and close ports i to n and two drain ports x.

The port a of the lockup shift valve 51 is connected to an oil pump 45 through an oil passage 63 and a constant pressure generator 50. Said pressure regulating solenoid valve 7 is disposed in the oil passage 63. The port d of the lockup shift valve 51 is connected to the oil pump 45 through an oil passage 65 and the constant pressure generator 50. The port h of the lockup shift valve 51 is connected to the oil pump 45 through an oil passage 69 in which said lockup control solenoid valve 6 is disposed. The port b of the lockup shift valve 51 communicates with the ports j and k of the lockup pressure regulating valve 52 through an oil passage 64. The port c of the lockup shift valve 51 is connected to the back pressure chamber 43 through the oil passage 42. The ports e and f are connected to the oil cooler 48 respectively by way of oil passages 66 and 67. The port g is connected to a regulating valve 49 by way of an oil passage 68. The port i of the lockup pressure regulating valve 52 is connected to a throttle pressure generator 61 by way of an oil passage 71. The throttle pressure generator 61 generates a pressure which becomes lower as the opening of the throttle valve 14 decreases. The ports l and m of the lockup pressure regulating valve 52 are connected to the regulating valve 49 by way of oil passages 72 and 73, respectively. The port n of the lockup pressure regulating valve 52 is connected to a portion of the oil passage 63 downstream of the pressure regulating solenoid valve 7. The throttle pressure generator 61 is connected to the regulating valve 49, and the regulating valve 49 and the constant pressure generator 50 are connected to the oil pump 45. Each of the oil passages 63, 65, 66, 69, 71 and 74 is provided with an orifice in a predetermined position.

The transmission gear mechanism 26 has four forward speeds and one rearward speed. That is, the shift lever can be positioned one of P-range, R-range, N-range, D-range, 2-range and 1-range. The transmission gear mechanism 26 comprises a planetary gear system and friction coupling elements such as brakes and clutches. The hydraulic control circuit 3 selectively applies working hydraulic pressure and release hydraulic pressure to the friction coupling elements by way of the aforesaid control valves and the shift valves and causes the friction coupling elements to engage or disengage, thereby causing the transmission gear mechanism 26 to shift to a gear speed which is determined according to the running condition of the vehicle.

A shown in FIG. 1, a control unit 100 receives a throttle opening signal St from a throttle opening sensor 81 which detects the opening of the throttle valve 14, a vehicle speed signal Sv from a vehicle speed sensor 82 which detects the running speed of the vehicle, a shift position signal Ss from a shift position sensor 83 which detects the position of the shift lever, an engine speed signal Sn from an engine speed sensor 84 which detects the engine speed, a turbine speed signal Sm from a turbine speed sensor 85 which detects the rotational speed of the turbine runner 36, an accelerator position signal Sa from an accelerator position sensor 86 which detects the amount of depression of the accelerator pedal, an oil temperature signal Su from an oil temperature sensor 87 which detects the temperature of the hydraulic oil supplied to the automatic transmission 20, a brake pedal position signal Sb from a brake position sensor 88 which detects the amount of depression of the brake pedal, and other various signals Sx which are required to control the automatic transmission 20. The control unit 100 outputs driving signals Ca, Cb, Cc, Cd, Ce, Cf and Cg to the shift control solenoid valves 1 to 5, the lockup control solenoid valve 6 and the pressure regulating solenoid valve 7 on the basis of the signals described above.

Figure 3:
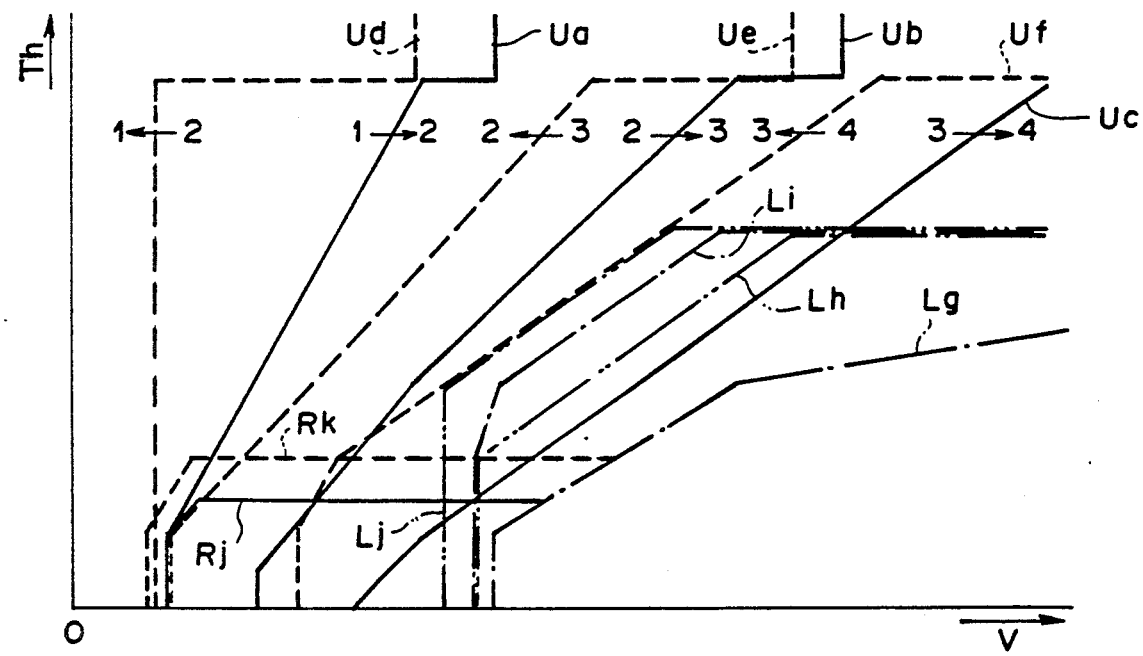

A shift pattern map shown in FIG. 3 has been stored in a built-in memory in the control unit 100. In FIG. 3, the ordinate represents the throttle opening Th and the abscissa represents the vehicle speed V. The control unit 100 compares the throttle opening represented by the the throttle opening signal St and the vehicle speed represented by the vehicle speed signal Sv with shift lines Ua, Ub, Uc, Ud, Ue and Uf in the shift pattern map, and determines whether the automatic transmission 20 is to shift. Further, the control unit 100 compares the throttle opening represented by the the throttle opening signal St and the vehicle speed represented by the vehicle speed signal Sv with lockup lines Lg and Li and with lockup release line Lh and Lj in the shift pattern map, and determines whether the torque converter 24 is locked or released. Further, the control unit 100 compares the throttle opening represented by the the throttle opening signal St and the vehicle speed represented by the vehicle speed signal Sv with slip control line Rj and with slip control interrupt line Rk in the shift pattern map, and determines whether the actual throttle opening and the vehicle speed are in the slip control range.

The shift lines Ua, Ub and Uc are the 1-2 upshift line, the 2-3 upshift line and the 3-4 upshift line, respectively. The shift lines Ud, Ue and Uf are the 2-1 downshift line, the 3-2 downshift line and the 4-3 downshift line, respectively. The lockup lines Lg and Li are used to determine that the torque converter 24 is to be locked at third and fourth, respectively. The lockup release line Lh and Lj are used to determine that the torque converter 24 is to be released at third and fourth, respectively. The slip control line Rj is used to determine that the slip control is to be initiated, and the slip control interrupt line Rk is used to determine that the slip control is to be interrupted.

When it is determined that neither of the lockup condition or the slip control condition have been satisfied, the control unit 100 cuts supply of the driving signal Cf to the lockup control solenoid valve 6 and cuts supply of the driving signal Cg to the pressure regulating solenoid valve 7, whereby the lockup control solenoid valve 6 and the pressure regulating solenoid valve 7 are closed. When the lockup control solenoid valve 6 is closed, hydraulic pressure from the constant pressure generator 50 is applied to the port h of the lockup shift valve 51 through the oil passage 69. When the pressure regulating solenoid valve 7 is closed, hydraulic pressure from the constant pressure generator 50 is applied to the port a of the lockup shift valve 51 and the port n of the lockup pressure regulating valve 52 respectively through the oil passages 63 and 74. As a result, the first and second spools 56 and 57 are shifted to a first position shown by the solid line in FIG. 2 overcoming the force of the spring 58 since the pressure receiving area of the land 57c of the second spool 57 is larger than that of any one of the lands 56a, 56b, 57a and 57b, and at the same time, the spool 60 is shifted to a first position shown by the solid line in FIG. 2 overcoming the force of the spring 62 since the hydraulic pressure applied to the port n of the lockup pressure regulating valve 52 is higher than the hydraulic pressure applied to the port i of the lockup pressure regulating valve 52 from the throttle pressure generator 61. When the first and second spools 56 and 57 of the lockup shift valve 51 is in the first position, the ports b and c communicate with each other, and the ports e and f communicate with each other. Further, when the spool 60 of the lockup pressure regulating valve 52 is in the first position, the ports k and 1 communicate with each other. Accordingly, the hydraulic pressure regulated by the regulating valve 49 is applied to the back pressure chamber 43, as it is, through the oil passages 72, 64 and 42, and the hydraulic pressure in the inner pressure chamber 44 is released to the oil cooler 48 through the oil passages 41 and 67.

In this case, the lockup clutch 22 is held away from the driving plate 32 and is released. That is, the pump impeller 34 and the turbine runner 36 of the torque converter 24 are mechanically disconnected from each other and the power is transmitted from the former to the latter by way of the fluid.

When it is determined that the lockup condition has been satisfied, the control unit 100 feeds the driving signal Cf to the lockup control solenoid valve 6 and cuts supply of the driving signal Cg to the pressure regulating solenoid valve 7, whereby the lockup control solenoid valve 6 is opened and the pressure regulating solenoid valve 7 are closed. When the lockup control solenoid valve 6 is opened, the hydraulic pressure applied to the port h of the lockup shift valve 51 is reduced, and when the pressure regulating solenoid valve 7 is closed, hydraulic pressure is applied to the port a of the lockup shift valve 51 and the port n of the lockup pressure regulating valve 52. As a result, the first and second spools 56 and 57 of the lockup shift valve 51 are shifted to a second position shown by the chained line in FIG. 2 under the force of the coil spring 58, and at the same time, the spool 60 of the lockup pressure regulating valve 52 is shifted to the first position. When the first and second spools 56 and 57 of the lockup shift valve 51 are in the second position and the spool 60 of the lockup pressure regulating valve 52 is in the first position, the ports g and e of the lockup shift valve 51 communicate with each other and the ports k and l of the lockup pressure regulating valve 52 communicate with each other, whereby hydraulic pressure regulated by the regulating valve 49 is applied to the inner pressure chamber 44 through the oil passages 68 and 41 and the hydraulic pressure in the back pressure chamber 43 is released to the oil pan through the oil passage 42 and a drain port which is opened and closed by the land 56b. In this case, the lockup clutch 22 is pressed against the driving plate 32. That is, the pump impeller 34 and the turbine runner 36 of the torque converter 24 are mechanically connected with each other and the torque converter 24 is locked.

When it is determined that the operating condition of the vehicle as represented by the throttle opening signal St and the vehicle speed signal Sv is in the range defined by the slip control line Rj and the slip control interrupt line Rk in the shift pattern map shown in FIG. 3, and at the same time, the normal slip control condition has been satisfied (e.g., the temperature of the hydraulic oil represented by the oil temperature signal Su is in a predetermined range, and the lockup control condition has not been satisfied), or when it is determined that the operating condition of the vehicle as represented by the throttle opening signal St and the vehicle speed signal Sv is in the range defined by the slip control line Rj and the slip control interrupt line Rk in the shift pattern map shown in FIG. 3, and at the same time, the deceleration slip control condition has been satisfied (i.e., the vehicle is in the decelerating state in which the engine speed represented by the engine speed signal Sn is not lower than a predetermined value and the throttle whose opening degree is represented by the throttle opening signal St is full closed), the control unit 100 outputs a driving signal Cf to the lockup control solenoid valve 6, and generates a driving signal Cg having a duty d which is set to a predetermined value not smaller than 20%, for instance, and outputs it to the pressure regulating solenoid valve 7 in order to effect the slip control.

Under these conditions, the first spool 56 of the lockup shift valve 51 is held in the first position shown by the solid line in FIG. 2 and the second spool 57 is held in the second position shown by the chained line in FIG. 2 by the hydraulic pressure applied to the port d of the lockup shift valve 51 from the oil pump 45 through the constant pressure generator 50 and the oil passage 65. Further, the spool 60 of the lockup pressure regulating valve 52 is shifted rightward as see in FIG. 2 from the first position by a distance which is determined according to the difference between the hydraulic pressure applied to the port i and that applied to the port n which lowers as the duty d of the driving signal Cg, and the effective opening area of the port l is reduced according to the duty d of the driving signal Cg. Accordingly, though the hydraulic pressure as regulated by the regulating valve 49 is applied to the inner pressure chamber 44 through the oil passage 68, the hydraulic pressure regulated by the regulating valve 49 is applied to the back pressure chamber 43 after it is reduced according to the duty d of the driving signal Cg by the lockup pressure regulating valve 52, and the lockup clutch 22 engages in slipping engagement with the driving plate 32 to operatively connect the pump impeller 34 and the turbine runner 36 in such a way as to produce a speed difference ΔN between the pump impeller 34 and the turbine runner 36 which corresponds to the pressure difference ΔP between the hydraulic pressures applied to the inner pressure chamber 44 and the back pressure chamber 43.

The pressure difference ΔP is represented by the following formula.

$$\Delta P = C1(Pt-Pd) + Fa/C2$$

wherein Pt represents the throttle pressure which is applied to the port i of the lockup pressure regulating valve 52, Pd represents the duty control pressure which is applied to the port n of the lockup pressure regulating valve 52, Fa represents the force of the spring 62, and C1 and C2 represents constants. That is, the pressure difference ΔP depends upon the throttle pressure Pt and the duty control pressure Pd. The throttle pressure Pt is related to the throttle opening Th as shown by the characteristic line in FIG. 4 in this particular embodiment, and the duty control pressure Pd is related to the duty d of the driving signal Cg as shown by the characteristic line in FIG. 5 in this particular embodiment. Accordingly, the pressure difference ΔP increases as the throttle opening Th increases and as the duty d of the driving signal Cg increases as shown by the characteristic lines in FIG. 6 which are plotted with the duty d used as a parameter.

Figure 7:
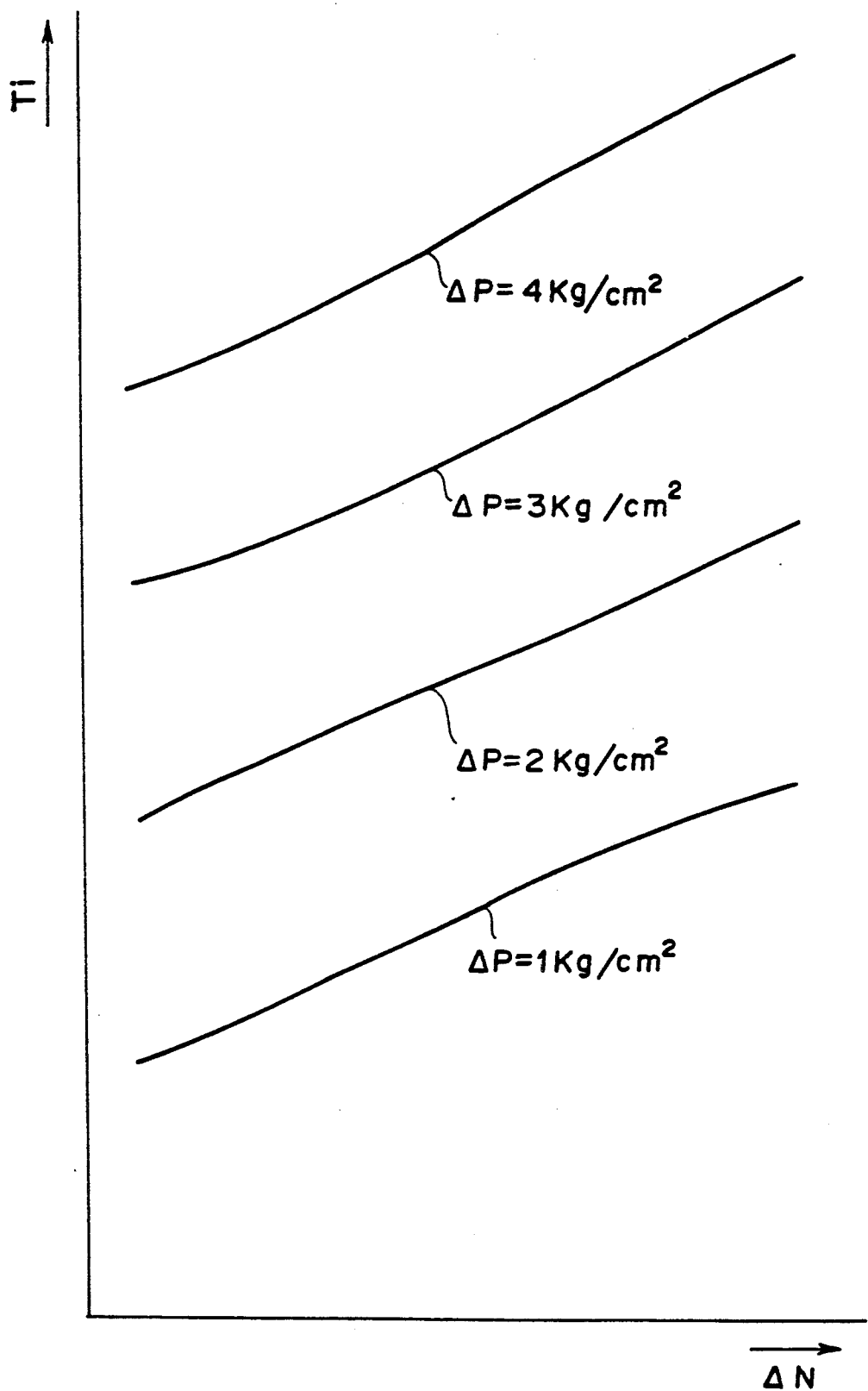

The maximum torque Ts which can be transmitted to the turbine runner 36 from the pump impeller 34 by way of lockup clutch 22 when the lockup clutch 22 is in friction engagement with the driving plate 32 (will be simply referred to as "the maximum transmissible torque", hereinbelow) is represented by the following formula.

$$Ts = \Delta P \cdot \mu \cdot r \cdot A$$

wherein μ represents the friction coefficient of the lockup clutch 22, r represents the effective radius of the lockup clutch 22, and A represent the contact area between th lockup clutch 22 and the driving plate 32. As can be understood from the formula, the maximum transmissible torque Ts increases as the pressure difference ΔP increases. When the input torque Ti to the torque converter 24, which is equal to the engine output torque Te, is larger than the maximum transmissible torque Ts, a speed difference ΔN is produced between the rotational speeds of the pump impeller 34 and the turbine runner 36. The relation between the input torque Ti and the speed difference ΔN is, for example, as shown by characteristic lines in FIG. 7 which are plotted with the pressure difference ΔP used as a parameter assuming that the oil temperature is 90° C.

Figure 8:
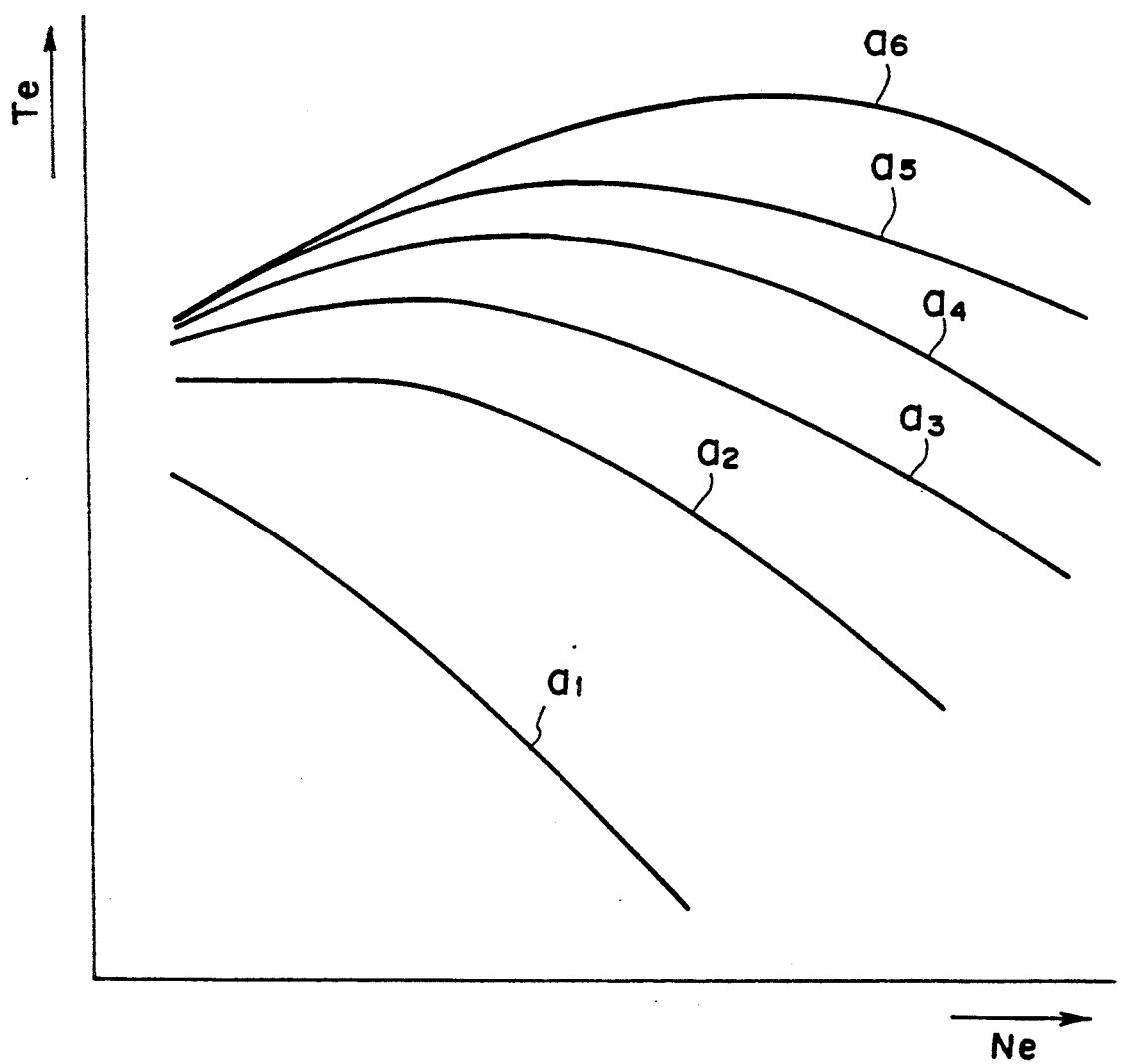

When it is determined that the normal slip control condition has been satisfied, the control unit 100 first determines the value of the engine output torque Te on the basis of the throttle opening and the engine speed Ne. The engine output torque Te has a relation with the throttle opening and the engine speed such as shown by the engine output torque curves a1 to a6 in FIG. 8, the curves a1 to a6 being for throttle openings of ⅛, 2/8, ⅜, 4/8, ⅝ and 6/8 of the full throttle opening, respectively. The values of the engine output torque Te for various values of the throttle opening and the engine speed have been stored in the built-in memory of the control unit 100 and the control unit 100 reads out the particular value of the engine output torque Te for the throttle opening and the engine speed at that time.

Then a transmissive torque Tr is set by multiplying the engine output torque thus obtained by a correction coefficient K which is set 1 when the oil temperature is 90° C. and is increased as the oil temperature rises from 90° C. and is reduced as the oil temperature lowers from 90° C. The value of the pressure difference $\Delta P$ which will produce a speed difference $\Delta N$ required to sufficiently reduce an energy loss in the torque converter 24 and sufficiently damp fluctuation in the engine output torque) e.g., 80 rpm) is read out from a map, in which the relation between the input torque Ti, the speed difference $\Delta N$ and the pressure difference $\Delta P$ shown in FIG. 7 has been written, on the basis of the transmissive torque Tr. The value of the speed difference $\Delta N$ is changed according to the operating condition of the engine, the running condition of the vehicle or the like.

Figure 6:
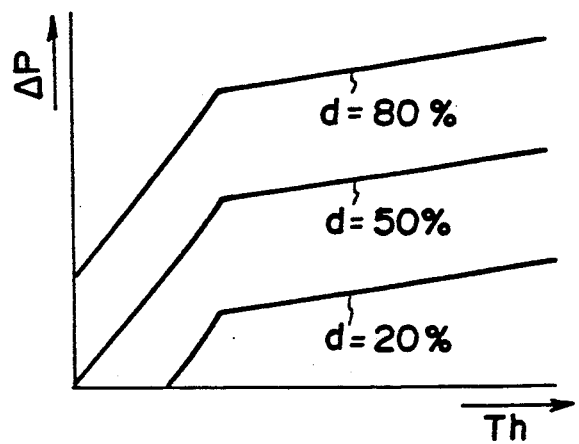

The value of the duty d which will produce the pressure difference $\Delta P$ thus determined is read out from a map in which the relation between the pressure difference $\Delta P$ and the duty d shown in FIG. 6 has been written. Then the control unit 100 generates the driving signal Cg which has a duty d corresponding to the pressure difference $\Delta P$ and outputs it to the pressure regulating solenoid valve 7.

When the difference $\Delta Y$ between the newly read value of the duty d and the value of the duty d which has been set is excessively large, the change in the pressure difference $\Delta P$ becomes too large and the vehicle body can be vibrated if the duty d is actually set at the newly read value. Accordingly, when the former is larger than the latter by a value larger than a predetermined upper limit, the duty d is set at the value which is obtained by adding the upper limit to the latter, and when the former is smaller than the latter by a value larger than a predetermined lower limit, the duty d is set at the value which is obtained by subtracting the lower limit from the latter.

. When the normal slip control is being effected, the pressure difference $\Delta P$ is set according to the input torque Ti to the torque converter 24 as described above, and accordingly, a speed difference $\Delta N$ between the pump impeller 34 and the turbine runner 36 which is adapted to the operating condition of the engine and at the same time contributes to reduction of energy loss in the torque converter 24 and absorption of fluctuation in the engine output torque is quickly produced, whereby the fuel economy is improved and vibration of the vehicle is suppressed.

When it is determined that the upshift condition has been satisfied while the normal slip control is being effected, the control unit 100 interrupts the normal slip control and fixes the value of the duty d to that which has been set immediately before the determination. Thus the control unit 100 effects gear-shifting slip control. When the upshift condition is satisfied and the gear-shifting slip control is effected, the pressure difference $\Delta P$ is thus set according to the input torque Ti to the torque converter 24 at the time the upshift condition begins to be satisfied, and accordingly, a speed difference $\Delta N$ between the pump impeller 34 and the turbine runner 36 which is adapted to the operating condition of the engine and at the same time contributes to absorption of fluctuation in the engine output torque is quickly produced, whereby occurrence of intense gear-shifting shock is prevented.

Further, when it is determined that the downshift condition has been satisfied while the normal slip control is being effected, the control unit 100 interrupts the normal slip control and stores the value of the duty d which has been set immediately before the determination as the set value dm, and interrupts supply of driving signals Cf and Cg to the lockup control solenoid valve 6 and the pressure regulating solenoid valve 7. Accordingly, the lockup clutch 22 is moved away from the driving plate 32 and the pump impeller 34 is disconnected from the turbine runner 36 so that the torque is transmitted to the turbine runner 36 through the fluid, whereby the gear-shifting shock is suppressed and the rotational speed of the turbine runner 36 is quickly increased. This ensures satisfactory accelerating performance of the vehicle.

When the downshift condition subsequently comes not to be satisfied while the normal slip control condition has been still satisfied, the control unit 100 sets a duty d which has, as the initial value, the value dm stored at the time the downshift condition came to be satisfied, and outputs a driving signal Cg having the set duty d, thereby restarting the normal slip control. In this manner, the aforesaid calculations for setting the duty d can be eliminated and the calculating time for setting the initial value of the duty d can be shortened.

Further, when it is determined that the deceleration slip control condition has been satisfied, the control unit 100 reads out the value of the torque Te' transmitted from the wheels to the engine (will be referred to as the "resisting torque" hereinbelow) according to the engine speed from the built-in memory in which values of the resisting torque Te' for various engine speeds empirically determined in advance have been stored. Then the control unit 100 multiplies the value of the resisting torque Te' by a correction coefficient to obtain a transmissive torque Tr', and obtains the value of the pressure difference $\Delta P$ which will produce a predetermined speed difference $\Delta N$ required to sufficiently suppress the vibration of the vehicle body and to enhance the engine brake effect on the basis of the transmissive torque Tr'. Then the control unit 100 sets the value of the duty d which will produce the pressure difference $\Delta P$ thus determined, and generates the driving signal Cg which has a duty d of the value and outputs it to the pressure regulating solenoid valve 7. The control unit 100 effects the deceleration slip control in this manner.

When it is determined that the upshift condition has been satisfied while the deceleration slip control condition is satisfied, the control unit 100 effects the gear-shifting slip control described above, and when it is determined that the downshift condition from third to second or second to first has been satisfied while the deceleration slip control condition is satisfied, the control unit 100 interrupts supply of driving signals Cf and Cg to the lockup control solenoid valve 6 and the pressure regulating solenoid valve 7 and the lockup clutch 22 is moved away from the driving plate 32.

Figure 4:
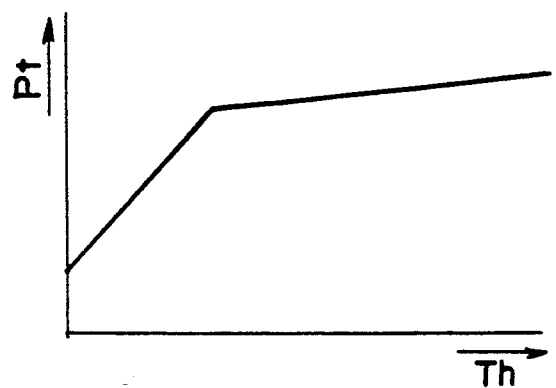
Figure 5:
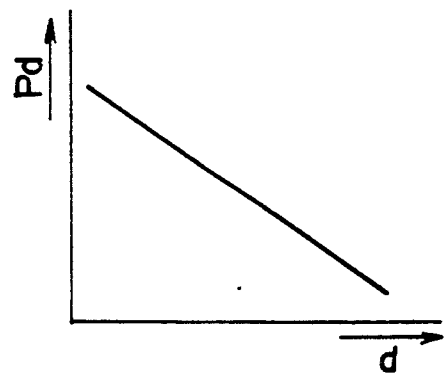

When it is determined that the brake pedal has been pushed down while the deceleration slip control condition is satisfied, the control unit 100 shifts the 4-3 downshift line Uf rightward in FIG. 4 so that the value of the vehicle speed V when the throttle opening Th is 0 on the 4-3 downshift line Uf is shifted toward the higher vehicle speed side, and when 4-3 downshift condition is satisfied on the basis of the shifted 4-3 downshift line, the control unit 100 effects the gear-shifting slip control as when the upshift condition is satisfied so that the lockup clutch 22 engages in slipping engagement. The reason why the lockup clutch 22 is controlled when the 4-3 downshift condition is satisfied in a different way from that in which it is controlled when the 3-2 downshift condition or the 2-1 downshift condition is satisfied is because, though the engine speed lowers below the fuel recovery speed at which the fuel-cut is interrupted when the automatic transmission 20 downshifts from third to second or from second to first while the deceleration slip control condition is satisfied and accordingly the engine is kept supplied with fuel, the engine speed does not lower than the fuel recovery speed and the fuel supply to the engine is cut off when the automatic transmission 20 downshifts from fourth to third while the deceleration slip control condition is satisfied.

As can be understood from the description above, the pressure difference $\Delta P$ is set according to the operating condition of the engine and the running condition of the vehicle while the deceleration slip control is being effected, and accordingly, a speed difference $\Delta N$ between the pump impeller 34 and the turbine runner 36 which is adapted to the operating condition of the engine is quickly produced, whereby fluctuation in the engine output torque can be effectively absorbed and vibration of the vehicle body can be suppressed, and at the same time, the engine brake effect is enhanced.

Further, since the 4-3 downshift condition is changed so that the time for which the automatic transmission 20 is kept in third is elongated when it is determined that the brake pedal has been pushed down while the deceleration slip control condition is satisfied, reduction of the engine speed is restrained and the period for which fuel supply to the engine is cut off is elongated. At the same time, since the gear-shifting slip control is effected and the lockup clutch 22 engages in slipping engagement when the changed 4-3 downshift condition is satisfied, the engine brake effect is enhanced as compared when the lockup clutch 22 is disengaged from the driving plate 32, and reduction of the engine speed is restrained and the period for which fuel supply to the engine is cut off is elongated. As a result, the fuel economy is improved.

On the other hand, when the 4-3 downshift condition is satisfied while the deceleration slip control condition has not been satisfied, the lockup clutch 22 is kept disengaged and the engine speed is increased more quickly than when the lockup clutch 22 is engaging in slipping engagement and the acceleration performance of the vehicle is improved.

The control unit 100 may be formed of a microcomputer and an example of the program which the microcomputer executes will be described with reference to FIGS. 9 to 12, hereinbelow.

Figure 9:
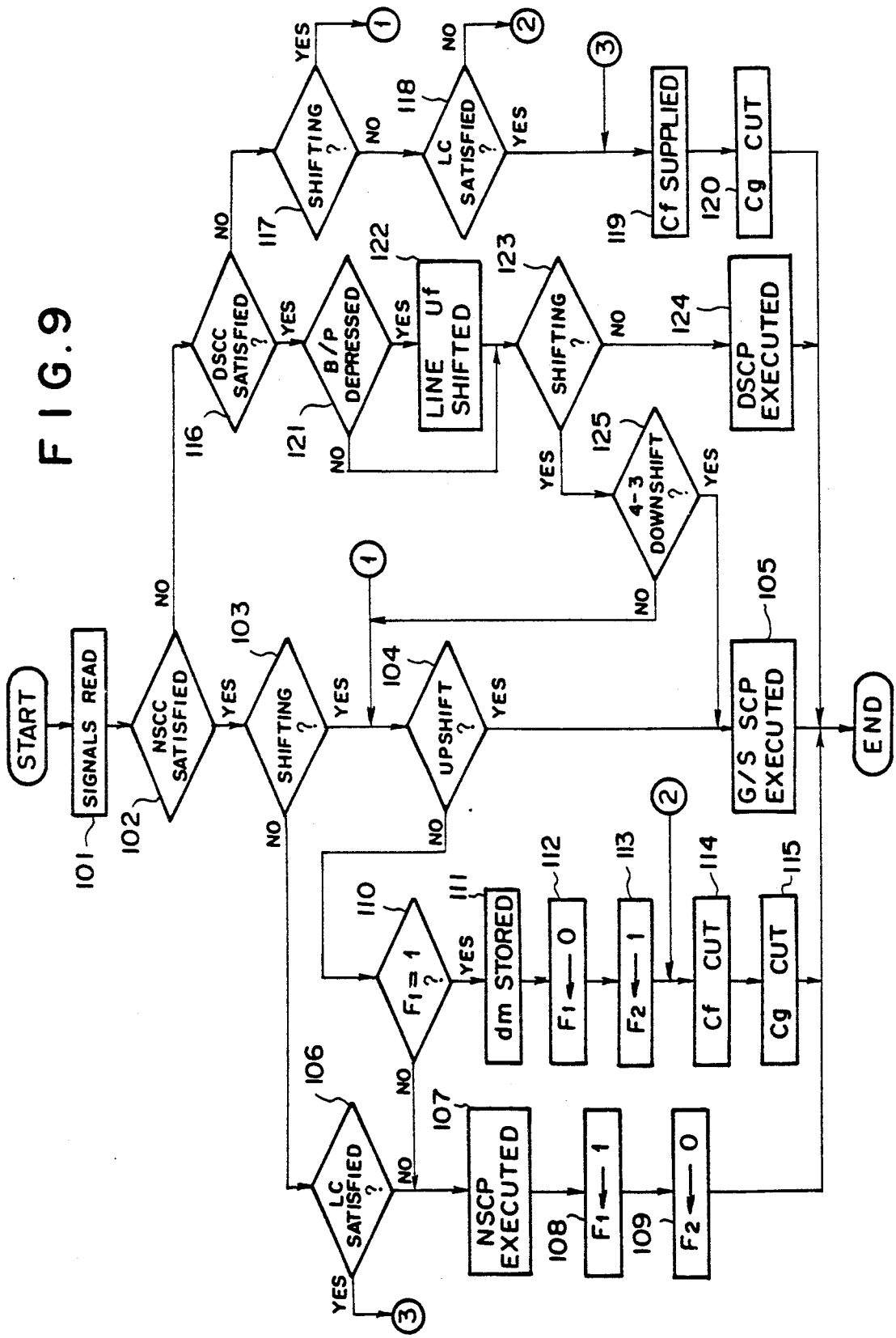
FIGS. 9 to 12 are flow charts showing an example of a program which, when a microcomputer is used as the control unit, the microcomputer executes.

In the main program shown in FIG. 9, the microcomputer first reads the various signals described above in step 101 and then determines whether the normal slip control condition (abbreviated as NSCC in the flow charts) has been satisfied in step 102. When it is determined in step 102 that the normal slip control condition has been satisfied, the microcomputer determines in step 103 whether the transmission gear mechanism 26 is shifting. When it is determined in step 103 that the transmission gear mechanism 26 is not shifting, the microcomputer determines in step 106 whether the lockup condition (abbreviated as 1c in the flow charts) has been satisfied. When it is determined in step 106 that the lockup condition has not been satisfied, the microcomputer executes in step 107 the normal slip control program (abbreviated as NSCP) shown in FIG. 10 (to be described later) and sets flag $F_1$ to 1 in step 108. Then the microcomputer sets flag $F_2$ to 0 in step 109 and returns.

When it is determined in step 103 that the transmission gear mechanism 26 is shifting, the microcomputer determines in step 104 whether the gear-shifting is an upshift. When it is determined in step 104 that the gear-shifting is an upshift, the microcomputer executes in step 105 the gear-shifting slip control program (abbreviated as G/S SCP) shown in FIG. 11 (to be described later) and returns.

When it is determined in step 104 that the gear-shifting is not an upshift, that is, when the gear-shifting is a downshift, the microcomputer determines in step 110 whether the flag $F_1$ has been set to 1. When it is determined in step 110 that the flag $F_1$ has not been set to 1, the microcomputer proceeds to step 107, and executes steps 107 to 109 as described above, and returns. On the other hand, when it is determined in step 110 that thew flag $F_1$ has been set to 1, the microcomputer stores in step 111 the value of the duty d at that time as the set value dm, and then in step 112, sets the flag $F_1$ to 0. Thereafter, the microcomputer sets the flag $F_2$ to 1 and proceeds to step 114. In step 114, the microcomputer interrupts supply of the driving signal Cf to the lockup control solenoid valve 6 and in step 115, the microcomputer interrupts supply of the driving signal Cg to the pressure regulating solenoid valve 7. Thereafter the microcomputer returns.

When it is determined in step 102 that the normal slip control condition has not been satisfied, the microcomputer determines in step 116 whether the deceleration slip control condition (abbreviated as DSCC in the flow charts) has been. When it is determined in step 116 that the deceleration slip control condition has not been satisfied, the microcomputer determines in step 117 whether the transmission gear mechanism 26 is shifting. When it is determined in step 117 that the transmission gear mechanism 26 is shifting, the microcomputer proceeds to step 104. On the other hand, when it is determined in step 117 that the transmission gear mechanism 26 is not shifting, the microcomputer determines in step 118 whether the lockup condition has been satisfied. When it is determined in step 118 that the lockup condition has not been satisfied, the microcomputer proceeds to step 114. When it is determined in step 118 that the lockup condition has been satisfied, the microcomputer outputs the driving signal Cf to the lockup control solenoid valve 6 in step 119 and outputs the driving signal Cg to the pressure regulating solenoid valve 7 in step 120. Thereafter the microcomputer returns.

When it is determined in step 116 that the deceleration slip control condition has been satisfied, the microcomputer determines in step 121 whether the brake pedal (abbreviated as B/P in the flow chart) has been pushed down. When it is determined in step 121 that the brake pedal has been pushed down, the microcomputer shifts the 4-3 downshift line Uf rightward in FIG. 4 so that the value of the vehicle speed V when the throttle opening Th is 0 on the 4-3 downshift line Uf is shifted toward the higher vehicle speed side, and then proceeds to step 123. Otherwise, the microcomputer directly proceeds to step 123.

In step 123, the microcomputer determines whether the transmission gear mechanism 26 is shifting. When it is determined in step 123 that the transmission gear mechanism 26 is not shifting, the microcomputer executes in step 124 the deceleration slip control program (abbreviated as DSCP in the flow chart) shown in FIG.

12, and then returns. Otherwise, the microcomputer determines in step 125 whether the gear-shifting is the 4-3 downshift. When it is determined in step 125 that the gear shifting is not the 4-3 downshift, the microcomputer proceeds to step 104, and otherwise the microcomputer proceeds to step 105.

When it is determined in step 106 that the lockup condition has been satisfied, the microcomputer proceeds to step 119.

Figure 10:
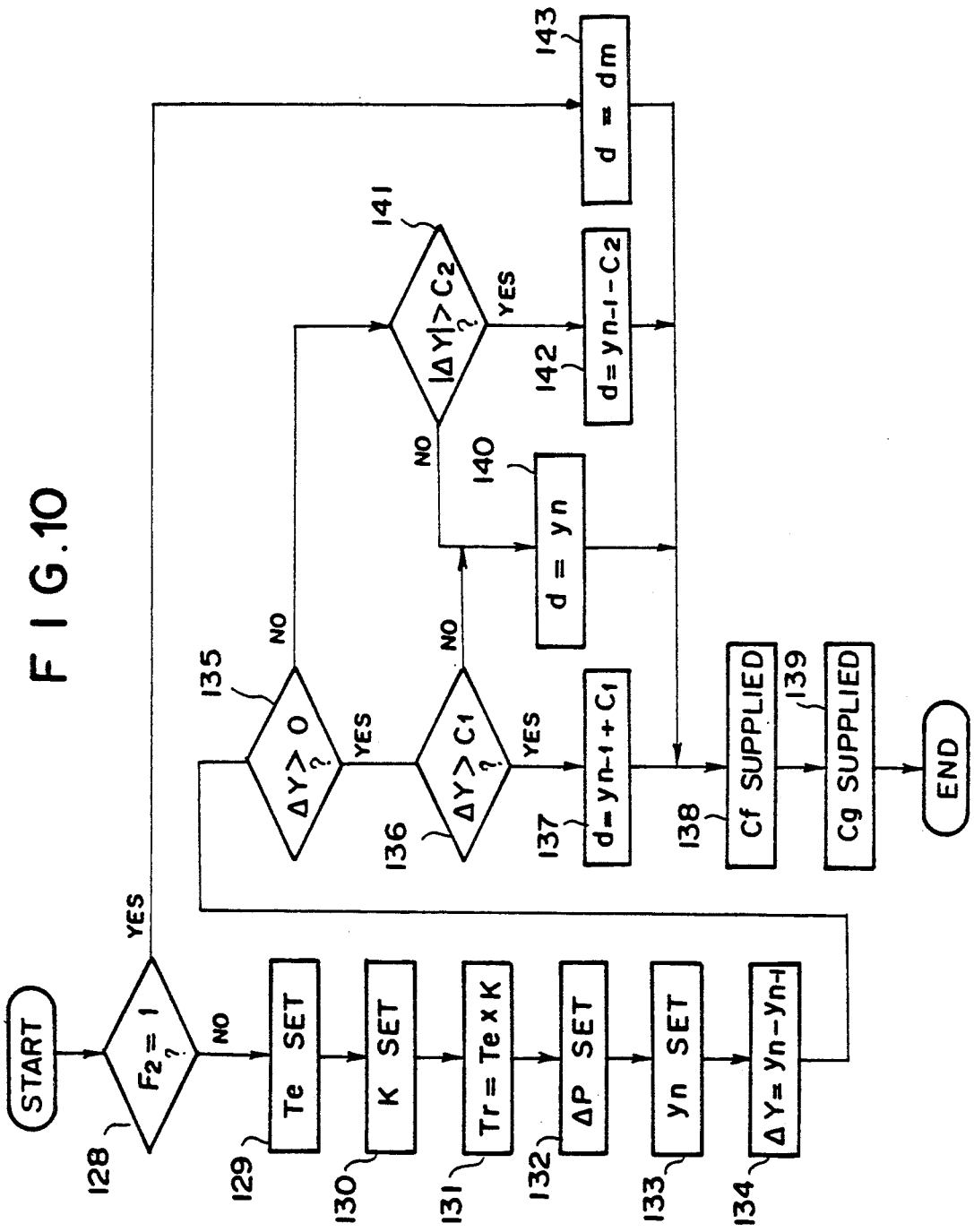

In the normal slip control program shown in FIG. 10, the microcomputer first determines in step 128 whether the flag $F_2$ has been set to 1. When it is determined in step 128 that the flag $F_2$ has not been set to 1, the microcomputer reads out from a map a value of the engine torque which corresponds to the throttle opening and the engine speed at that time and sets the engine torque Te in step 129. The microcomputer sets in step 130 the value of the correction coefficient K according to the oil temperature represented by the oil temperature signal Su, and sets in step 131 the transmissive torque Tr on the basis of formula $Tr = Te \times K$.

Then in step 132, the microcomputer sets the value of the pressure difference $\Delta P$ which will produce a desired speed difference $\Delta N$ on the basis of the value of the transmissive torque Te set in step 131. The microcomputer sets the value $y_n$ (n standing for a positive integer) of the duty d which will produce the pressure difference $\Delta P$ in step 133. In step 134, the microcomputer calculates the difference $\Delta Y$ between the newly set value $y_n$ of the duty d and the preceding value $y_{n-1}$ of the duty d, and in step 135, the microcomputer determines whether the difference $\Delta Y$ is positive. When it is determined in step 135 that the difference $\Delta Y$ is positive, the microcomputer determines in step 136 whether the absolute value of the difference is larger than a predetermined upper limit C1. When it is determined in step 136 that the absolute value of the difference is larger the upper limit C1, the microcomputer sets the value of the duty d at the value which is obtained by adding the upper limit C1 to the preceding value $y_{n-1}$, and proceeds to step 138.

In step 138, the microcomputer supplies the driving signal Cf to the lockup control solenoid valve 6, and in step 139, the microcomputer generates a driving signal Cg having a duty d set in step 137 and delivers it to the pressure regulating solenoid valve 7.

On the other hand, when it is determined in step 136 that the absolute value of the difference is not larger the upper limit C1, the microcomputer sets in step 140 the duty d at the value $y_n$. Thereafter the microcomputer executes steps 138 and 139.

When it is determined in step 135 that the difference $\Delta Y$ is negative, the microcomputer determines in step 141 whether the absolute value of the difference is larger than a predetermined lower limit C2. When it is determined in step 141 that the absolute value of the difference is larger than the lower limit C2, the microcomputer sets in step 142 the value of the duty d at the value which is obtained by subtracting the lower limit C2 from the preceding value $y_{n-1}$, and proceeds to step 138. On the other hand, when it is determined in step 141 that the absolute value of the difference is not larger the lower limit C2, the microcomputer sets in step 140 the duty d at the value $y_n$. Thereafter the microcomputer executes steps 138 and 139.

Further, when it is determined in step 128 that the flag $F_2$ has been set to 1, the microcomputer sets in step 143 the value of the duty d at the set value dm which has been stored in step 111 in the main program shown in FIG. 9, and then executes steps 138 and 139.

Figure 11:
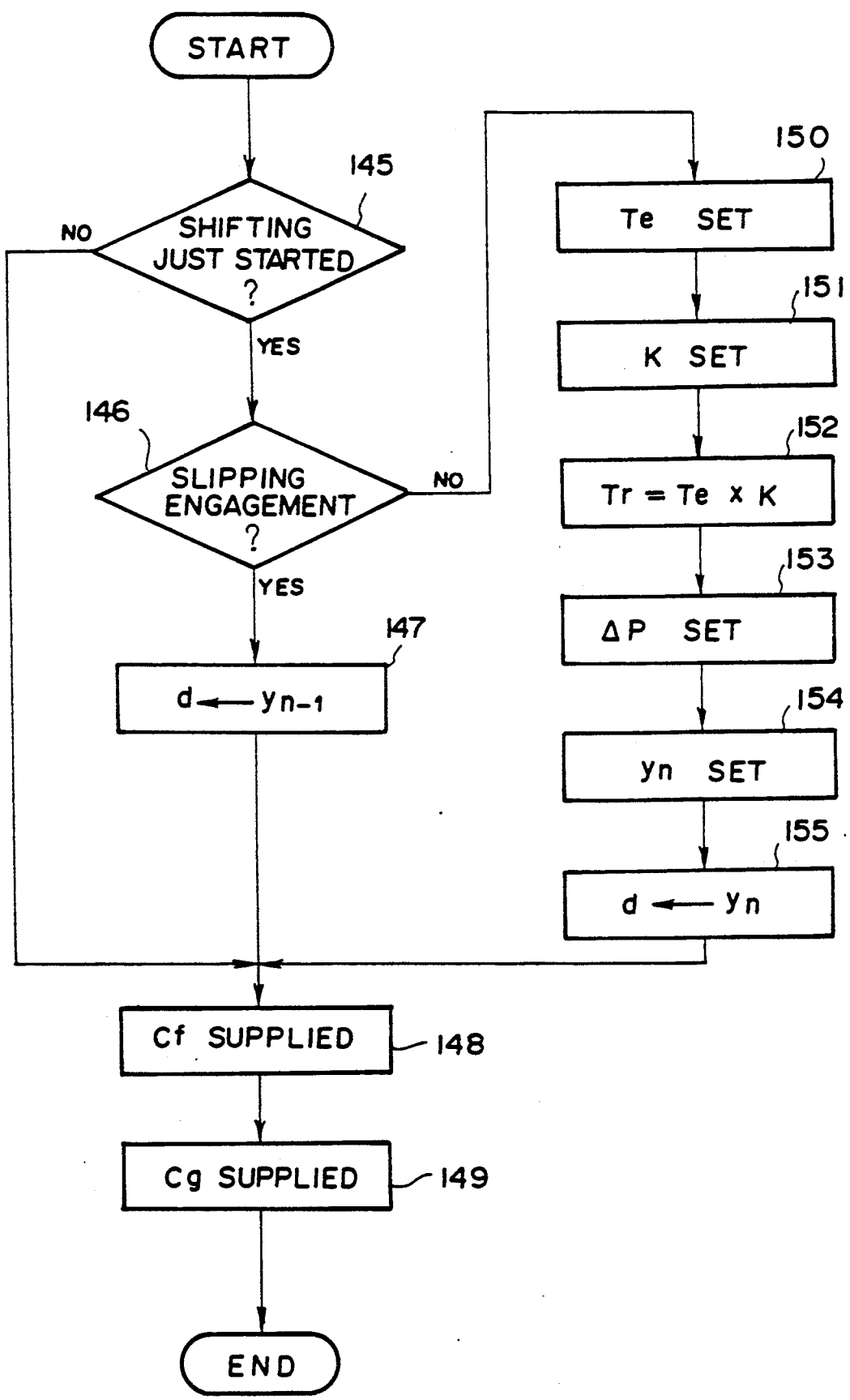

In the gear-shifting slip control program shown in FIG. 11, the microcomputer determines in step 145 whether the gear-shifting has been just started. When it is determined in step 145 that the gear-shifting has been just started, the microcomputer determines in step 146 whether the lockup clutch 22 is in slipping engagement. When it is determined in step 146 that the lockup clutch 22 is in slipping engagement, the microcomputer sets the value of the duty d at the preceding value $y_{n-1}$ and then proceeds to step 148. When it is not determined in step 45 that the gear-shifting has been just started, the microcomputer directly proceeds to step 148.

The microcomputer outputs the driving signal Cf to the lockup control solenoid valve 6 in step 148 and outputs the driving signal Cg to the pressure regulating solenoid valve 7 in step 149, the value of the duty d of the driving signal Cg has been set in the preceding steps.

When it is determined in step 146 that the lockup clutch 22 is not in slipping engagement, the microcomputer executes steps 150 to 154 and then proceeds to step 155. Steps 150 to 154 are same as the steps 129 to 133 in the normal slip control program shown in FIG. 10, and will not be described here. In step 155, the microcomputer sets the value of the duty d at $y_n$. Thereafter, the mc executes steps 148 and 149.

In the gear-shifting slip control program, the pressure difference $\Delta P$ is obtained in the manner similar to that in the normal slip control program shown in FIG. 10, but it is made to be smaller than that obtained in the normal slip control program.

Figure 12:
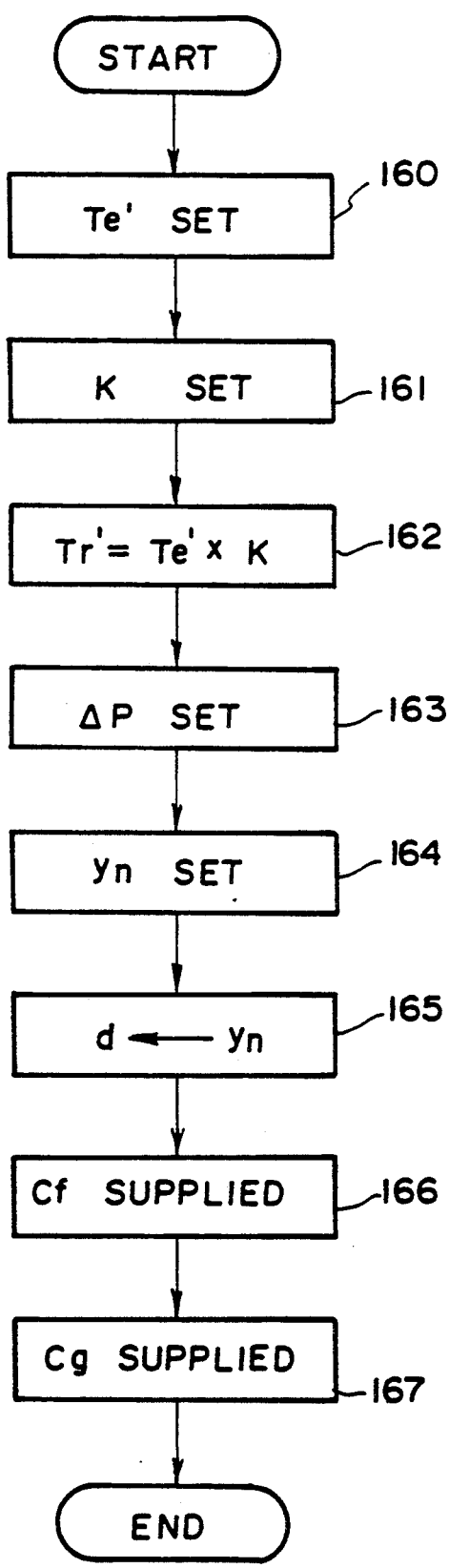

In the deceleration slip control program shown in FIG. 12, the microcomputer first sets the resisting torque Te' in step 160 and then sets in step 161 the value of the correction coefficient K. Thereafter the microcomputer sets the transmissive torque Tr' on the basis of formula $Tr' = Te' \times K$. Then in step 163, the microcomputer sets the value of the pressure difference $\Delta P$ according to the transmissive torque Tr'. Further the microcomputer sets the value $y_n$ of the duty d which will produce the pressure difference $\Delta P$ in step 164. In step 165, the microcomputer sets the value of the duty d at $y_n$. Then the microcomputer supplies the driving signal Cf to the lockup control solenoid valve 6 in step 166, and in step 167, the microcomputer generates a driving signal Cg having a duty d set in step 165 and delivers it to the pressure regulating solenoid valve 7.

We claim:

1. A control system for a fluid coupling for an automatic transmission of a vehicle having a transmission mechanism which fluid coupling includes an input element connected to an output shaft of the engine, an output element connected to the transmission mechanism of the automatic transmission and a lockup clutch interposed between the input element and the output element, the lockup clutch being able to engage and disengage to operatively connect and disconnect the input element and the output element with and from each other and further being able to engage in slipping engagement to connect the input element and the output element in such a way as to allow the input element and the output element to rotate relative to each other, said control system comprising a shift detecting means which detects the gear-shifting operation of the transmission mechanism, a hydraulic pressure supply means which supplies hydraulic pressure to the lockup clutch and selectively causes the lockup clutch to engage, disengage and engage in slipping engagement, the engaging force of the lockup clutch when it is in slipping engagement being changed according to signals indicative of the running condition of the vehicle, and a hydraulic control means which controls the hydraulic pressure supply means according to the running condition of the vehicle, wherein said hydraulic control means causes the hydraulic pressure supply means to supply hydraulic pressure which causes the lockup clutch to engage with a substantially fixed engaging force which causes slipping engagement of the lockup clutch when the shift detecting means detects an upshift operation of the transmission mechanism and the lockup clutch is in slipping engagement upon detection of the upshift operation, and the hydraulic control means causes the hydraulic pressure supply means to supply hydraulic pressure which causes the lockup clutch to disengage when the shift detecting means detects a downshift operation of the transmission mechanism and the lockup clutch is in slipping engagement upon detection of the downshift operation.

2. A control system as defined in claim 1 in which when the shift detecting means detects that the transmission mechanism has finished the downshifting, said hydraulic control means causes the hydraulic pressure supply means to supply hydraulic pressure which causes the lockup clutch to engage in slipping engagement with the engaging force with which the lockup clutch was in slipping engagement a the time when the shift detecting means detected the downshift operation of the transmission mechanism.

3. A control system as defined in claim 2 in which when the shift detecting means detects an upshift operation of the transmission mechanism while the lockup clutch is in slipping engagement, said hydraulic control means causes the hydraulic pressure supply means to supply hydraulic pressure which fixes the engaging force of the lockup clutch to the value with which the lockup clutch has been in slipping engagement.

4. A control system as defined in claim 1 in which said hydraulic control means causes the hydraulic pressure supply means to supply to the lockup clutch the hydraulic pressure which causes the lockup clutch to engage in slipping engagement with the engaging force which will produce a target rotational speed difference between the input element and the output element which is determined according to the operating condition of the engine represented by the throttle opening and the engine speed.

5. A control system as defined in claim 4 in which, when a new target rotational speed difference is determined in response to change of the operating condition of the engine, the new target rotational speed difference is limited, irrespective of the actual operating condition of the engine at that time, not to be larger or smaller than the preceding target rotational speed difference by a value which is larger than a predetermined limit value.

6. A control system as defined in claim 5 in which when the new target rotational speed difference as determined according to the actual operating condition of the engine at that time is larger than the preceding target rotational speed difference by a value which is larger than the predetermined limit value, the new target rotational speed difference is determined as the value obtained by adding the predetermined limit value to the preceding target rotational speed difference.

7. A control system as defined in claim 5 in which when the new target rotational speed difference as determined according to the actual operating condition of the engine at that time is smaller than the preceding target rotational speed difference by a value which is larger than the predetermined limit value, the new larger rotational speed difference is determined as the value obtained by subtracting the predetermined limit value from the preceding target rotational speed difference.

* * * * *